United States Patent [19]

Sander et al.

[11] Patent Number: 4,557,938

[45] Date of Patent: Dec. 10, 1985

[54] PRODUCT AND PROCESS FOR IMPROVING THE DISPERSION OF A VEGETABLE GUM IN WATER

[75] Inventors: Eugene H. Sander, Rte. 1, Box 83, Hayfield, Minn. 55940; Douglas R. Cook, Hayfield, Minn.

[73] Assignee: Eugene H. Sander, Hayfield, Minn.

[21] Appl. No.: 524,145

[22] Filed: Aug. 17, 1983

[51] Int. Cl.$^4$ .................................................. A23L 1/04
[52] U.S. Cl. .................................... 426/453; 426/467; 426/573; 426/658; 426/575
[58] Field of Search ............... 426/453, 573, 576, 467, 426/658

[56] References Cited

U.S. PATENT DOCUMENTS

| | | | |
|---|---|---|---|
| 2,949,428 | 8/1960 | Leo | 252/363.5 |
| 2,977,203 | 3/1961 | Sienkiewicz | 426/453 |
| 3,143,428 | 8/1964 | Reimers et al. | 426/453 |
| 3,250,624 | 5/1966 | Van Ness | 99/78 |
| 3,251,695 | 5/1966 | Gidlow et al. | 426/453 |
| 3,279,924 | 10/1966 | Peebles | 426/453 |
| 3,306,958 | 2/1967 | Gidlow | 426/453 |
| 3,328,173 | 6/1967 | Van Ness | 99/78 |
| 3,396,034 | 8/1968 | Blondheim et al. | 426/453 |
| 3,740,232 | 6/1973 | Purves et al. | 426/453 |
| 3,748,201 | 6/1973 | Jordan | 149/109 |
| 3,850,838 | 11/1974 | Guckenberger et al. | 426/453 |
| 4,246,037 | 1/1981 | Cottrell | 106/208 |
| 4,363,669 | 12/1982 | Cottrell et al. | 106/205 |

*Primary Examiner*—Jeanette Hunter
*Attorney, Agent, or Firm*—Kinney & Lange

[57] ABSTRACT

A process is used to increase the rate and quality of dispersion of a vegetable gum in water. The vegetable gum is dry blended with a food grade particulate carrier, such as starch, in a fluidized bed. The mixture of the carrier and the vegetable gum is intermittently sprayed sufficiently to wet the surfaces of the carrier and vegetable gum. During the spraying, the particles become tacky and stick to each other to form agglomerated particles. Between the intermittent spraying, the particles are dried by the air fluidizing the bed. The intermittent spraying and drying is continued until agglomerated vegetable gum/carrier particles are formed having a moisture content below approximately 25% by weight.

27 Claims, 3 Drawing Figures

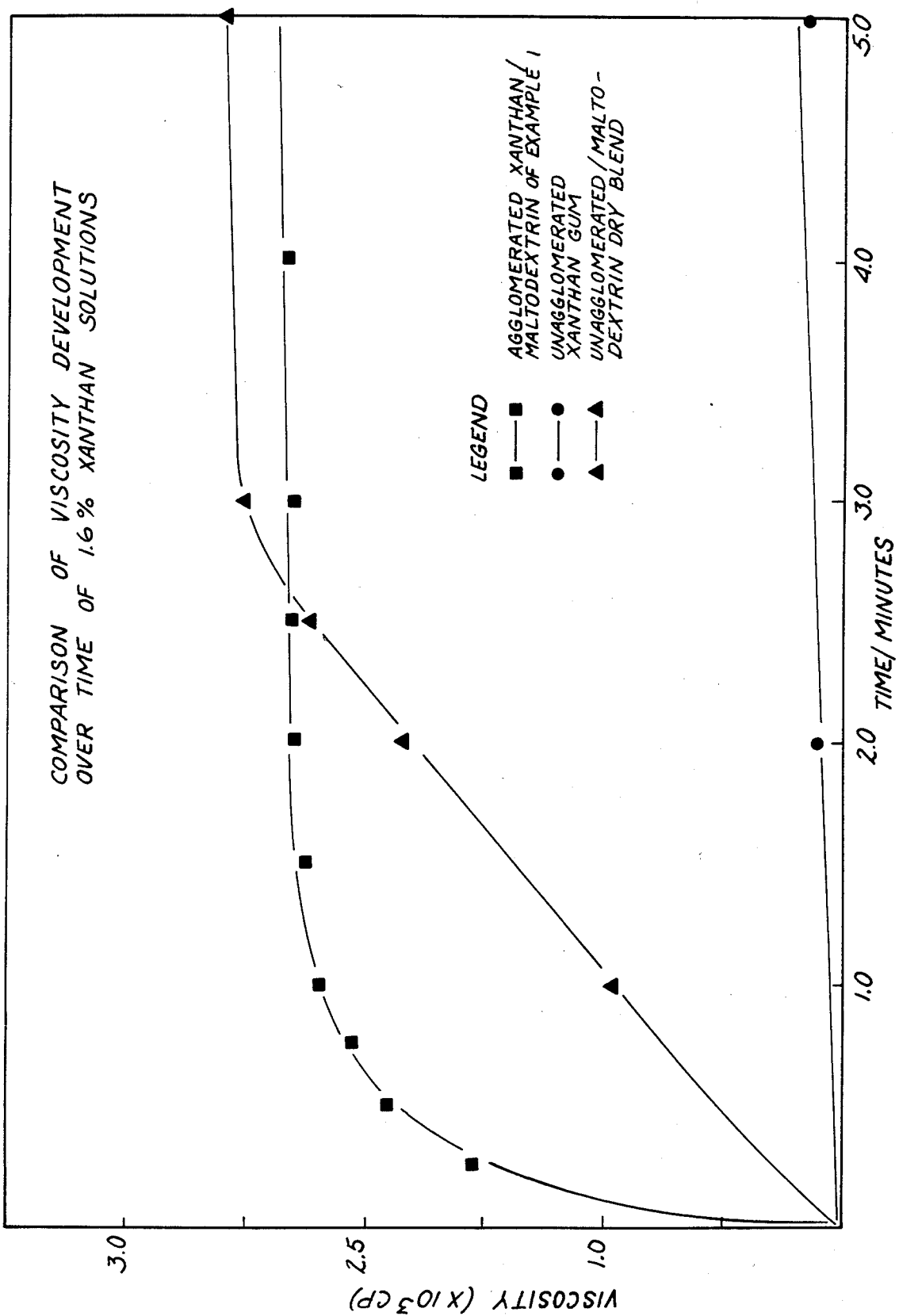

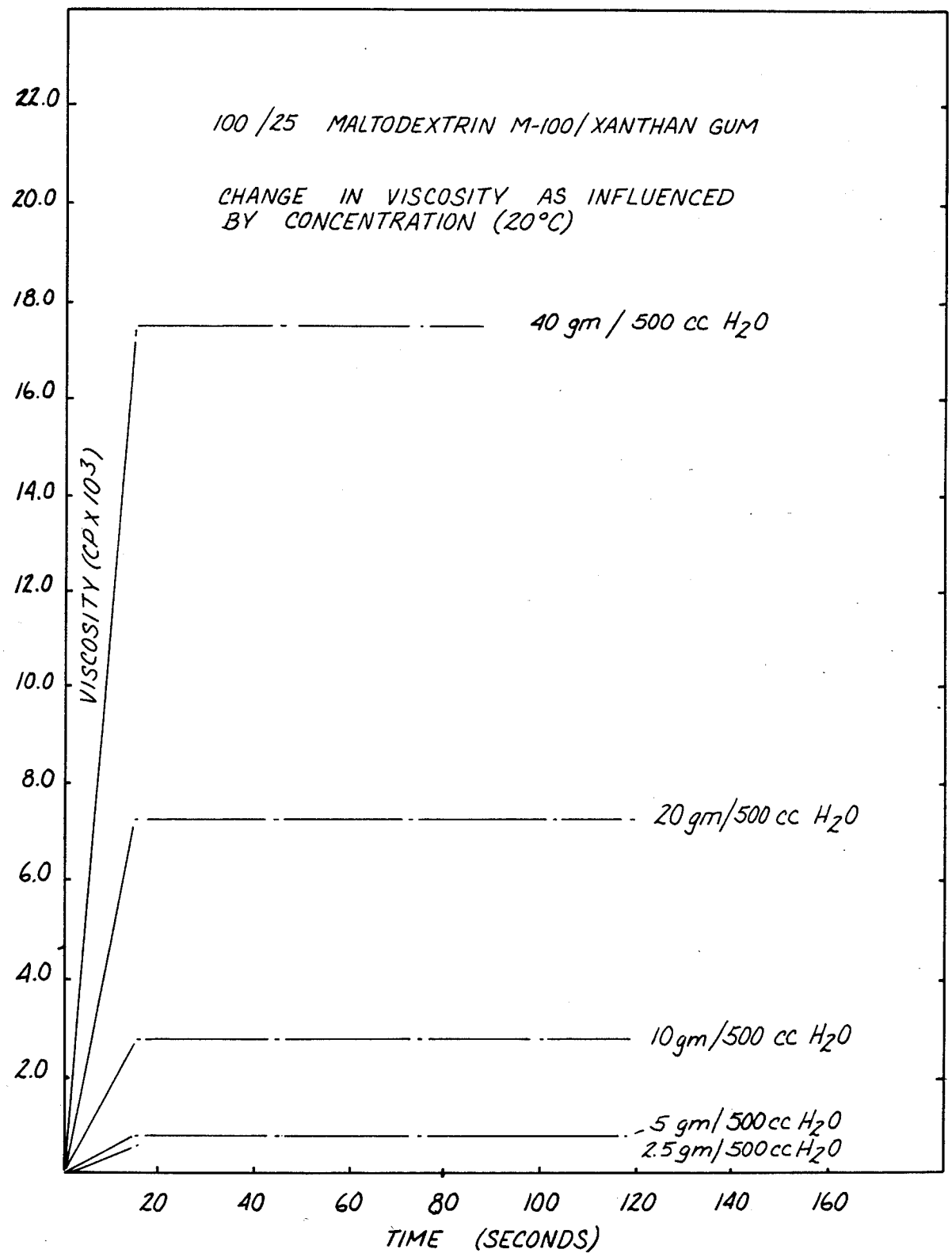

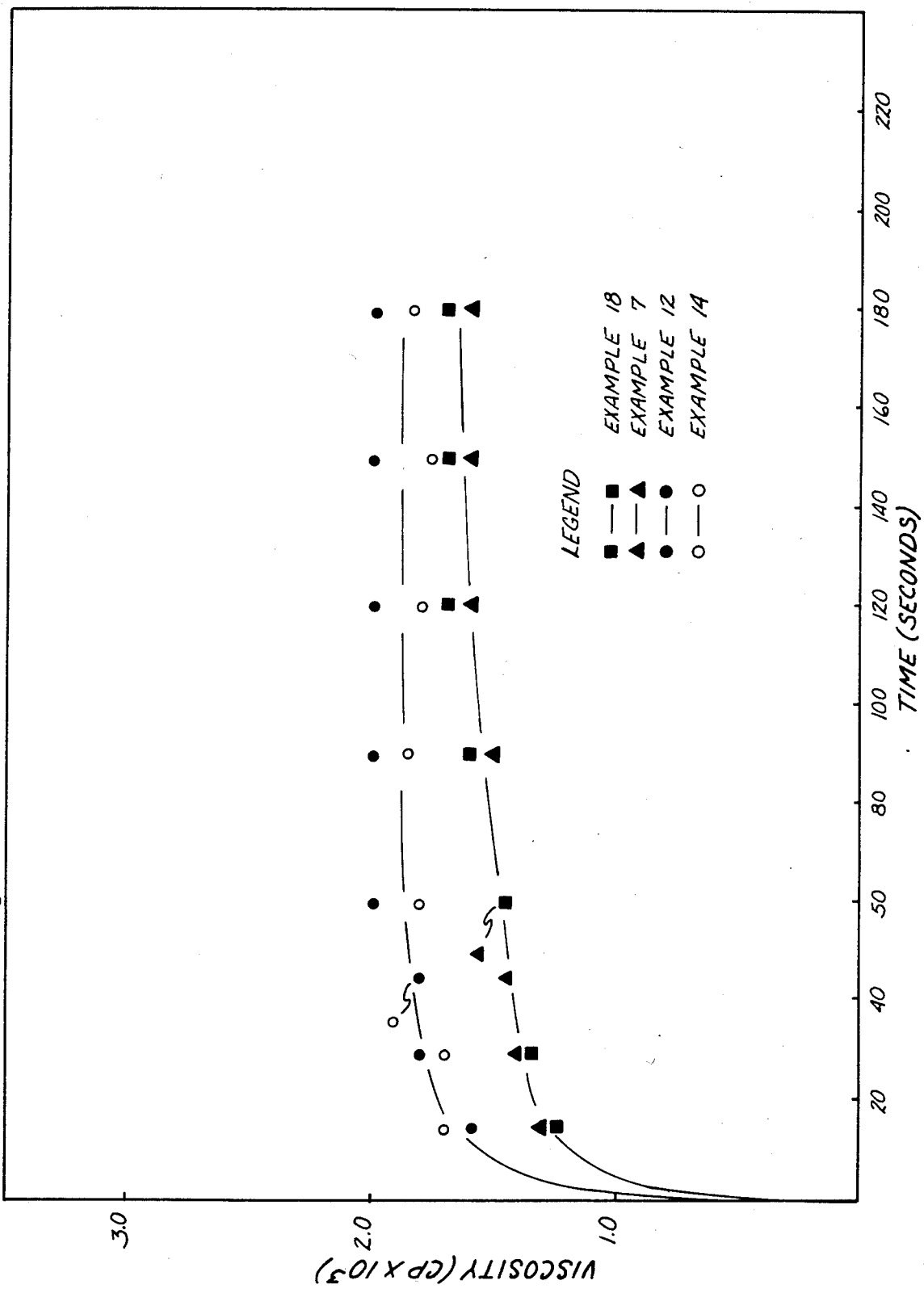

4,557,938

PRODUCT AND PROCESS FOR IMPROVING THE DISPERSION OF A VEGETABLE GUM IN WATER

BACKGROUND OF THE INVENTION

1. Field of the Invention

The present invention relates to a process that increases the rate and quality of disperson of a vegetable gum and the product prepared by the process.

2. Description of the Prior Art

Vegetable gums are naturally occurring or synthesized polysaccharide materials which are commonly used as viscosity control agents in processed foods, such as salad dressings or dry soup mixes.

In the case of a salad dressing, viscosity control is essential for maintaining homogeneity so that oil/water separation is kept to a minimum and/or the solids in the salad dressing are maintained in suspension until the salad dressing is consumed.

In the case of a dry soup mix, the dry soup mixture is dispersed by the consumer in water using variations in conditions such as quantity of water, temperature, mixing vessels and agitation methods. These conditions often vary from the prescribed directions that are included on the package of the product. The vegetable gum performs essentially the same functions relating to viscosity control as in the salad dressing, that is, minimizing oil/water separation and maintaining suspension of solids in solution. However, due to the varied conditions in which a dry soup mix is dispersed into water, the vegetable gum may not be dispersed properly resulting in "fisheye" formation. "Fisheyes" are the result of localized surface wetting of a cluster of gum particles with the cluster having a dry center.

Similarly, a food processor will experience the same type of "fisheye" formation in preparing an aqueous dispersion of a vegetable gum for use in a food such as a salad dressing. Although expensive and time consuming, the food processor has the knowledge and resources to use several techniques to effect proper dispersion of the vegetable gum.

In both instances, whether it is the ultimate consumer or the manufacturer who disperses the vegetable gum in water, fisheye formation is a problem.

One known prior art technique which attempts to disperse the vegetable gum in aqueous systems is to first dry blend the vegetable gum with sucrose. The vegetable gum and sucrose are then added to the water using high sheer agitation. The most effective high sheer system is to generate a vortex in the liquid with the vegetable gum and carrier being slowly added into the moving vortex to minimize localized particulate surface wetting and "fisheye" size. However, such a technique does not eliminate "fisheyes" but merely minimizes their size and occurence and is expensive in terms of time spent in reducing the "fisheye" problem.

Another technique used in the prior art which attempts to evenly disperse the vegetable gum and water is dispersing the vegetable gum first thereby maximizing the water/vegetable gum ration and preventing interference by other components in the gum hydration process. This technique is typically used for multi-component foods wherein several dry ingredients must be re-hydrated. The vegetable gum is typically dispersed in a vortex and slowly added thereto to minimize localized particulate surface wetting and "fisheye" size.

Another prior art process is disclosed in the Leo U.S. Pat. No. 2,949,428 wherein locust bean gum is rendered cold water soluble by agitating the locust bean gum with sugar in the presence of steam or a fine mist of water. The resulting mixture is a solid, foamy, spongy mass which is then heated. However, the physical state of the locust bean gum, being in a spongy mass, is not particularly suited for later use in a product such as a dry soup mix due to its high moisture content.

SUMMARY OF THE INVENTION

The present invention is a process that changes the physical character of vegetable gum particles so that the particles will disperse quickly and uniformly into solution and the product produced by the process. The process includes dry blending a particulate vegetable gum and a food grade particulate carrier to form a dry blended mixture. The mixture is then fluidized with a gaseous air stream and is sprayed intermittently with a fluid so that the vegetable gum and the carrier particles are wetted. The fluidized mixture is sprayed in an intermittent manner to allow the carrier and vegetable gum particles to dry while in contact with each other thereby agglomerating vegetable gum and carrier particles with each other. It has been found that the resultant agglomeration of vegetable gum and starch or equivalent particles suprisingly increases the rate of dispersion of the gum within an aqueous solution and virtually eliminates the formation of "fisheyes" in the solution.

BRIEF DESCRIPTION OF THE DRAWINGS

FIG. 1 is a graph illustrating the viscosity development of the agglomerated particle of the present invention, described hereinafter in Example 1, in comparison to viscosity development of an unagglomerated gum.

FIG. 2 is a graph illustrating the viscosity development of various concentrations of the agglomerated particles of Example 1.

FIG. 3 is a graph illustrating viscosity development of agglomerated gums of Examples 7, 13, 15 and 19, set forth hereinafter.

DETAILED DESCRIPTION OF THE PREFERRED EMBODIMENTS

The present invention increases the rate of dispersion of a vegetable gum in an aqueous solution and renders the gum uniformly dispersible within the solution eliminating formation of "fisheyes". The process includes agglomerating the vegetable gum particles with a food grade particulate carrier such as starch. The agglomerated gum/carrier particles keep the vegetable gum particles separated from each other and minimize the surface area of the gum particles available for hydration with water. Although starch is the preferred carrier, other particulate carriers are operable in the present invention. The agglomeration process produces interstitial voids among the vegetable gums and starch particles thereby increasing available areas for hydration of the gum particles.

As used herein, the term "vegetable gum" includes those highly soluble gums in particulate form that are synthetically produced or naturally occurring carbohydrate polymers of high molecular weight which are commonly used as viscosity control agents in foods. Examples of such vegetable gums include gums that are isolated from plant materials, such as alginates from kelp plants, carrageenan from seaweeds, guar and locust bean from seeds, and pectins from fruits. Vegetable gums also include exudates from plants, such as gum arabic, and gums prepared by bacterial fermentation, such as xanthan gum.

As used herein, food grade particulate carrier includes those foodstuffs that are generally produced in a fine grain form and are recognized as suitable for human consumption, such as starch. Starch includes those polysaccharides obtained from plants which are partially or completely hydrolized to D-glucose. Modified starches (such as maltodextrins, corn syrup solids and dextrose) in particulate form are included within the present invention.

It is well known that vegetable gums are difficult to disperse uniformly in an aqueous solution. The problem with dispersion of many of the gums that are commonly used commercially is that they are extremely soluble. The extreme solubility of the gums renders the gums difficult to disperse without long and vigorous agitation to remove lumps or "fisheyes" to achieve a homogeneous solution.

The process of the present invention combines a highly soluble vegetable gum with a food grade particulate carrier such as starch in a unique manner, which decreases the available surface area on the gum particle for immediate contact with water. The process agglomerates a particulate vegetable gum with a particulate starch to form an agglomerated particle wherein the gum particles are separated by the starch particles.

The process includes placing the vegetable gum particles and the starch particles in a conventional batch-type fluidized dryer Model WSG such as is made by Glatt Air Techniques, Inc. of New Jersey. Although a batch-type fluid bed dryer system is specifically referred to, any system that agglomerates particulate vegetable gum with a particulate carrier is included within the present invention. The dryer includes an entry through which heated air is introduced and distributed so that the gum and starch particles are fluidized and blended together. The fluidized blend of vegetable gum and starch particles are then sprayed with a liquid, such as water, from an atomizing nozzle located above the fluidized bed. The particles, as they move through the fluid bed, are sprayed intermittently, with the residence time of each spraying interval lasting long enough to only wet the surface of the particles.

Although the exact mechanism of agglomeration is not known, the following explanation is believed to be true. In the fluidized bed, the vegetable gum and starch particles are moving about colliding with each other. During spraying, the surfaces of the particles become wet and tacky, resulting in the particles sticking to each other after a collision. When the particles move away from the spray nozzle, the air dries the particles and the particles become bound to each other. Spraying and drying intervals are continued until agglomerated particles are formed. The agglomerated particles have a preferred final moisture content of less than 10% permitting usage of the agglomerated particle in products such as a dry soup mix. However, a moisture content as high as 25% is still satisfactory for purposes of later handling the agglomerated particles.

Preferably, the agglomerated particles are allowed to build so that the particle size distribution is such that 98% of the agglomerated particles will pass through a 10 mesh sieve and not more than 10% through a 200 mesh sieve. The particle size distribution of the agglomerated particles of vegetable gum and carrier is not critically important to the present invention. A desired mean particle size or particle size distribution is dependent upon the particular food application.

The agglomerated particles of vegetable gum and starch quickly dissolve into solution when mixed with water. Typically, maximum viscosity development of the solution is reached within 10 to 20 seconds of adding the agglomerated particles to water. Fisheye formation is virtually eliminated, creating an acceptable appearance to a consumer using a product of the present invention in a product such as a dry soup mix. In the case of a preprocessed food, such as a salad dressing, the manufacturer does not have to resort to time consuming and costly methods to place the gum into solution or to use procedures to insure that lumps or fisheyes do not form.

The following examples are intended to illustrate the present invention and are not to be taken as limiting in any way.

EXAMPLE 1

A mixture of xanthan gum and maltodextrin having a Dextrose Equivalency (DE) of 10 as defined by *Journal Biological Science*, Vol. 160, p. 61, 1945, were placed in a fluidized bed dryer. The particular fluidized bed dryer used was a WSG 120 manufactured by Glati Air Techniques of Ramsey, N.J. The maltodextrin was added at a 4:1 weight ratio with respect to the xanthan gum. Countercurrent airflow was turned on in the dryer and kept at an approximate temperature range of 70° C. to 90° C. The initial fluidization of the bed blended the xanthan gum and maltodextrin. After two minutes of dry blending, a spray nozzle was turned on and the xanthan gum and maltodextrin particles were placed in an intermittent spray and drying cycle for 25 minutes. The fluidized bed dryer is configured such that the spray nozzle is located in the central portion of the dryer and defines a spray zone which consists of a portion of the volume within the dryer. The air flow in the dryer conveys the particles up to the spray zone and then moves these particles away from the spray zone towards the sides of the dryer where the particles are dried by heat of the flowing air. The residence time of the particles under the spray nozzle was approximately 35 seconds following each 35 second spray interval. A three second filter shake interval removes fines from an air/product separation filter. The fines fall back into the stagnant bed of particulate matter. The spray/shake cycle was repeated through a total run time of 23 minutes. Finally, the intermittent spray/shake cycle is followed by a 1-2 minute final drying period required to achieve the desired final product moisture. The resulting particles were of a size such that typically 98% of the particles passed through a 10 mesh sieve and not more than 10% of the agglomerated particles passed through a 200 mesh sieve. The particles were allowed to dry to a moisture content of 10% after the spray nozzle was turned off.

The resulting agglomerated xanthan gum/maltodextrin particles had a dispersibility/dissolution rate of approximately not more than 15 seconds. The procedure to determine a quantifiable dispersibility/dissolution rate included the following method and apparatus.

A 600 ml beaker with a magnetic bar was placed on a magnetic stirrer and was filled with 500 ml cold tap water having a temperature of 7°–10° C. A speed setting was selected to generate a vortex that reached out to approximately the 200 ml mark on the beaker. A 40 gram sample of the xanthan/maltodextrin mixture was poured into the vortex without hesitation and the time noted. The time was noted when viscosity development eliminated the existence of a visible vortex (typically the magnetic bar within the beaker stopped).

To measure the viscosity, a suitable spindle attached to a Brookfield (Hv) Viscometer was inserted into the beaker. Deflection readings (sheer stress) at 15 second intervals were taken. The readings were taken in various positions within the beaker to insure maximum contact (no channeling) with the attached spindle. The resulting data is shown in a graph in FIG. 1. The graph shows that a major portion of viscosity development using the agglomerated particles of the present invention occurs within the first 15 seconds of dispersion.

FIG. 1 also compares the viscosity development of the product of Example 1 to a 1.6% by weight xanthan gum solution using unagglomerated xanthan gum. The product of Example 1 is also compared to a 1.6% by weight xanthan gum solution prepared by mixing an unagglomerated dry blend of xanthan gum/maltodextrin. As can be noted in FIG. 1, the viscosity development of the unagglomerated xanthan gum and the unagglomerated dry blend of xanthan gum/maltodextrin is much slower than the viscosity development of the product of Example 1. Furthermore, lumps or "fisheyes" were observed in both the unagglomerated xanthan gum and the unagglomerated xanthan gum/maltodextrin mixtures.

The unagglomerated xanthan gum failed to develop any significant viscosity even up to 10 minutes (800 cp). The unagglomerated xanthan gum/maltodextrin dry blend did better, however, the rate of viscosity development was much slower than the agglomerated product of Example 1.

The viscosity development of agglomerated xanthan/maltodextrin in FIG. 1 is quite unlike the viscosity development of unagglomerated xanthan gum introduced in an aqueous solution, or xanthan gum merely dry blended with another soluble component, such as sucrose.

In further work verifying the above procedure, the xanthan gum/maltodextrin mixture was added using the same procedure as immediately described above, but adding a different amount of xanthan gum/maltodextrin to the 600 ml beaker. As illustrated in FIG. 2, 2.5 gram, 5 gram, 10 gram and 20 gram samples had no appreciable effect on the rate of viscosity development within the beaker and all samples achieved almost full viscosity development within approximately 15 seconds of being introduced to the solution in the beaker.

EXAMPLES 2-7

| Example | Gum Type (% by weight) | Carrier Type (% by weight) | Dispersibility/ Dissolution Rate (40 grams) | Visual Characteristics |
|---|---|---|---|---|
| 2 | carboxymethyl cellulose 7HF (40%) | maltodextrin DE = 10 (60%) | 10 seconds | Homogeneous solution, no fisheyes |
| 3 | carboxymethyl cellulose 7H8SF (30%) | maltodextrin DE = 10 (70%) | 10 seconds | Homogeneous solution, no fisheyes |
| 4 | carboxymethyl cellulose 7H8SF (10%) | maltodextrin DE = 10 (90%) | 10 seconds | Homogeneous solution, no fisheyes |
| 5 | carboxymethyl cellulose 7H4CF (30%) | malodextrin DE = 10 (70%) | 12 seconds | Homogeneous solution, no fisheyes |
| 6 | carboxymethyl cellulose 7H4CF (10%) | maltodextrin DE = 10 (90%) | 10 seconds | Homogeneous solution, no fisheyes |
| 7 | carboxymethyl cellulose 7HF (40%) | maltodextrin DE = 10 (60%) | 15 seconds | Homogeneous solution, no fisheyes |

Examples 2-7 were prepared following essentially the same procedure as in Example 1 with the exception that carboxymethyl cellulose was used instead of xanthan gum and the ratio of carboxymethyl cellulose with respect to maltodextrin was varied. The resulting product of Examples 2-7 quickly dissolved into solution with viscosity development essentially occurring with the first 10-15 seconds. The solution was homogeneous and contained no fisheyes.

EXAMPLES 8-11

| Example | Gum Type (% by weight) | Carrier Type (% by weight) | Dispersibility/ Dissolution Rate (40 grams) | Visual Characteristics |
|---|---|---|---|---|
| 8 | hydroxyethyl cellulose (10%) | maltodextrin DE = 10 (90%) | 8 seconds | Homogeneous solution, no fisheyes |
| 9 | hydroxyethyl cellulose MHR (30%) | maltodextrin DE = 10 (70%) | 12 seconds | Homogeneous solution, no fisheyes |
| 10 | hydroxyethyl cellulose 250 MHR (10%) | maltodextrin DE = 10 (90%) | 10 seconds | Homogeneous solution, no fisheyes |
| 11 | hydroxyethyl cellulose 250 MHR (30%) | maltodextrin DE = 10 (70%) | 13 seconds | Homogeneous solution, no fisheyes |

Examples 8-11 were prepared following essentially the same procedure as in Example 1 with the exception that a hydroxyethyl cellulose was used. Various commercially-available hydroxyethyl cellulose were used and the concentration of the gum with respect to the maltodextrin was also varied. The testing procedure used to determine dispersibility/dissolution rate was the same as in Example 1. The resulting product of Examples 8-11 quickly dissolved and formed a homogeneous solution with no fisheyes.

EXAMPLES 12-14

| Example | Gum Type (% by weight) | Carrier Type (% by weight) | Dispersibility/ Dissolution Rate (40 grams) | Visual Characteristics |
|---|---|---|---|---|
| 12 | alginate (10%) | maltodextrin DE = 20 (90%) | 10 seconds | Homogeneous solution, no fisheyes |
| 13 | alginate | maltodextrin | 12 | Homogeneous |

| Example | Gum Type (% by weight) | Carrier Type (% by weight) | Dispersibility/ Dissolution Rate (40 grams) | Visual Characteristics |
|---|---|---|---|---|
|  | (20%) | DE = 20 (80%) | seconds | solution, no fisheyes |
| 14 | alginate (20%) | maltodextrin DE = 10 (80%) | 12 seconds | Homogeneous solution, no fisheyes |

Examples 12-14 were prepared following essentially the same procedure as in Example 1 with the exception that alginate was used as the gum. The amount of alginate with respect to the maltodextrin was varied and two types of maltodextrin were used. The testing procedure used to determine the dispersibility/dissolution rate was the same as in Example 1. The resulting product of the Examples 12-14 produced a homogeneous solution with no fisheyes.

EXAMPLES 15-19

| Example | Gum Type (% by weight) | Carrier Type (% by weight) | Dispersibility Dissolution Rate (40 grams) | Visual Characteristics |
|---|---|---|---|---|
| 15 | locust bean gum (20%) | maltodextrin DE = 10 (80%) | 11 seconds | Homogeneous solution, no fisheyes |
| 16 | gum arabic (20%) | maltodextrin DE = 10 (80%) | 12 seconds | Homogeneous solution, no fisheyes |
| 17 | low nethyl pectin (20%) | maltodextrin DE = 10 (80%) | 12 seconds | Homogeneous solution, no fisheyes |
| 18 | guar gum (20%) | maltodextrin DE = 10 (80%) | 13 seconds | Homogeneous solution, no fisheyes |
| 19 | carrageenan 250 MHR (20%) | maltodextrin DE = 10 (80%) | 10 seconds | Homogeneous solution, no fisheyes |

Examples 15-19 were prepared following essentially the same procedure as in Example 1 with the exception that five different gums, namely, locust bean, gum arabic, low methoxyl pectin, guar gum and carrageenan, were used at a 20% concentration with respect to the total weight of gum/maltodextrin with the maltodextrin having a DE of 10. The testing procedure used to determine the dispersibility/dissolution rate was the same as used in Example 1. Each product formed a homogeneous solution containing no fisheyes.

FIG. 3 is a graph illustrating the apparent viscosity development rate of Examples 7, 12, 14 and 18 which graphically illustrate the rapid dissolution and dispersibility of various gums processed according to the present invention.

EXAMPLES 20-22

| Example | Gum Type (% by weight) | Carrier Type (% by weight) | Dispersibility/ Dissolution Rate (40 grams) | Visual Characteristics |
|---|---|---|---|---|
| 20 | xanthan (20%) | dextrose DE = 100 (80%) | 15 seconds | Homogeneous solution, no fisheyes |
| 21 | xanthan (20%) | sweet dairy whey (80%) | 18 seconds | Homogeneous solution, no fisheyes |
| 22 | xanthan (20%) | maltodextrin DE = 4 (80%) | 25 seconds | Homogeneous solution, no fisheyes |

Examples 20-22 were prepared following essentially the same procedure as in Example 1 with the exception of varying the carrier used with xanthan gum. Three different carriers, namely, dextrose, sweet dairy whey and maltodextrin having a DE=4, were used with the same percentage of xanthan gum (20%). The testing procedure used to determine the dispersibility/dissolution rate was the same as in Example 1. The products of Examples 20-22 produced a homogeneous solution with no fisheyes.

EXAMPLES 23-27

| Example | Gum Type (% by weight) | Carrier Type (% by weight) | Dispersibility/ Dissolution Rate (40 grams) | Visual Characteristics |
|---|---|---|---|---|
| 23 | xanthan (20%) | maltodextrin DE = 20 (80%) | 15 seconds | Homogeneous solution, no fisheyes |
| 24 | xanthan (40%) | maltodextrin DE = 20 (80%) | 30 seconds | Homogeneous solution, no fisheyes |
| 25 | xanthan (60%) | maltodextrin DE = 20 (80%) | 300 seconds | Slow dispersion, fisheyes, foamed but dispersed |
| 26 | xanthan (80%) | maltodextrin DE = 20 (80%) | 600 seconds | Slow dispersion, lumps formed but dispersed |
| 27 | xanthan (100%) | no carrier | 900 seconds | Very slow dispersion, homogeneous solution developed |

Examples 23-27 were prepared following essentially the same procedure as in Example 1 with the exception that the concentration of the xanthan gum with respect to the maltodextrin (having a DE of 20) was varied. The physical testing procedure used to determine the dispersibility/dissolution rate was the same as in Example 1. The amount of agglomerated gum/carrier added to 500 ml of water was adjusted in order to maintain the final xanthan gum level constant at approximately 1.6% by weight of the water. In Examples 25-27 where the ratio of xanthan gum to maltodextrin was greater than 50%, dissolution/dispersibility was more difficult to achieve using the test procedure of Example 1. It should be noted that the test for dispersibility/dissolution developed by the applicant does not employ a sheer force of any significance. Therefore, Examples 25-27, although not producing a product that readily dissolves and disperses as the products described in previous examples, will suitably disperse into solution in a high sheer mixer.

CONCLUSION

The present invention produces an agglomerated particle containing a vegetable gum wherein the vegetable gum's rate of viscosity development in an aqueous solution is greatly increased with the resulting viscous solution containing virtually no lumps or fisheyes.

Although the present invention has been described with reference to preferred embodiments, workers skilled in the art will recognize that changes may be made in form and detail without departing from the spirit and scope of the invention.

What is claimed is:

1. A process for producing a particle having a vegetable gum component, the particle being characterized by quick dispersion in an aqueous solution, the process comprising:

dry blending a food grade particulate carrier and vegetable gum particles to obtain a dry blended mixture;

fluidizing the carrier/vegetable gum mixture with a gaseous stream;

intermittently spraying the mixture with a liquid spray while the mixture is in a fluidized state causing the surfaces of the particles to become tacky and the particles to stick to each other;

permitting the particles to dry between spraying intervals; and continuing spraying and drying of the particles until agglomerated particles are produced having a moisture content of less than 25% by weight of the agglomerated particle.

2. The process of claim 1 wherein the vegetable gum is xanthan gum.

3. The process of claim 1 wherein the vegetable gum is carboxymethyl cellulose.

4. The process of claim 1 wherein the vegetable gum is alginate.

5. The process of claim 1 wherein the vegetable gum is locust bean gum.

6. The process of claim 1 wherein the vegetable gum is gum arabic.

7. The process of claim 1 wherein the vegetable gum is guar gum.

8. The process of claim 1 wherein the vegetable gum is carrageenan.

9. The process of claim 1 wherein the food grade particulate carrier is starch.

10. The process of claim 9 wherein the starch is maltodextrin.

11. The process of claim 1 wherein the food grade particulate carrier is dairy whey.

12. The process of claim 1 wherein the vegetable gum to food particulate carrier ratio is less than 1:1.

13. A product produced by the process of claim 1 characterized by its dispersion and dissolution in an aqueous solution in less than 20 seconds.

14. A product produced by the process of claim 1 characterized by the absence of lumps or fisheyes when introduced into an aqueous solution.

15. A process for preparing an agglomerated particle having a vegetable gum component, the particle characterized by its quick dispersibility and dissolution into an aqueous solution, the process comprising:

agglomerating vegetable gum particles with a food grade particulate carrier in a fluidized bed dryer by fluidizing the particles with a gaseous stream and intermittently spraying the vegetable gum particles and the particulate carrier rendering surfaces of the particles and the particulate carrier tacky and then permitting partially agglomerated particles to dry between spraying intervals to produce a finished agglomerated particle wherein the carrier and gum particles are bound to each other and the finished agglomerated particles having a moisture content below approximately 25% by weight of the agglomerated particle.

16. The process of claim 15 wherein the food grade particulate is starch.

17. The process of claim 16 wherein the starch is a maltodextrin.

18. The process of claim 15 wherein the vegetable gum is xanthan gum.

19. The process of claim 15 wherein the vegetable gum is carboxymethyl cellulose.

20. The process of claim 15 wherein the vegetable gum is alginate.

21. The process of claim 15 wherein the vegetable gum is locust bean gum.

22. The process of claim 15 wherein the vegetable gum is gum arabic.

23. The process of claim 15 wherein the vegetable gum is guar gum.

24. The process of claim 15 wherein the vegetable gum is gum carrageenan.

25. The process of claim 15 wherein the food grade particulate to vegetable gum ratio is greater than 1:1.

26. The process of claim 1 wherein the food grade particulate carrier is vegetable gum.

27. The process of claim 15 wherein the food grade particulate carrier is vegetable gum.

* * * * *